(12) United States Patent
Ga et al.

(10) Patent No.: US 11,712,931 B2
(45) Date of Patent: Aug. 1, 2023

(54) DEVICE AND METHOD FOR MONITORING TIRE PRESSURE OF ELECTRIC VEHICLE

(71) Applicants: Hyundai Motor Company, Seoul (KR); Kia Corporation, Seoul (KR)

(72) Inventors: Han Seon Ga, Gyeonggi-do (KR); Sang Wook Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 213 days.

(21) Appl. No.: 17/361,882

(22) Filed: Jun. 29, 2021

(65) Prior Publication Data
US 2022/0161614 A1    May 26, 2022

(30) Foreign Application Priority Data
Nov. 25, 2020   (KR) .......................... 10-2020-0160396

(51) Int. Cl.
  *B60C 23/06*   (2006.01)
  *G06F 17/17*   (2006.01)
(52) U.S. Cl.
  CPC ............ *B60C 23/062* (2013.01); *G06F 17/17* (2013.01)
(58) Field of Classification Search
  CPC ... B60C 23/062; B60C 23/061; B60C 23/064; B60C 2019/006; G06F 17/17; B60K 1/02; B60K 7/0007; B60K 35/00; B60K 2370/178; B60Y 2200/91; B60Y 2400/3032; B60Y 2400/307; B60Y 2400/90

USPC ......................................................... 340/442
See application file for complete search history.

(56) References Cited

U.S. PATENT DOCUMENTS

| | | | |
|---|---|---|---|
| 5,913,241 A * | 6/1999 | Ohashi ................... | B60C 23/20 73/146 |
| 8,397,559 B2 | 3/2013 | Fischer et al. | |
| 8,573,045 B2 | 11/2013 | Gotschlich | |
| 8,970,361 B2 | 3/2015 | Sakagami et al. | |
| 2008/0208502 A1* | 8/2008 | Koukes ................ | B60C 23/061 73/146 |
| 2010/0211250 A1 | 8/2010 | Fischer et al. | |

FOREIGN PATENT DOCUMENTS

EP         2190682 B1    12/2017

* cited by examiner

*Primary Examiner* — Eric Blount
(74) *Attorney, Agent, or Firm* — Fox Rothschild LLP

(57) ABSTRACT

A tire pressure monitoring device of an electric vehicle includes a wheel speed sensor sensing a speed of each wheel of the electric vehicle, and a controller selectively calculating an intercept value of ΔFR and a cumulative average value of the ΔFR based on a difference between a torque of a front wheel motor and a torque of a rear wheel motor, calculating an intercept value of ΔLR and an intercept value of ΔDiag based on the speed of each wheel, and monitoring a tire pressure of each wheel based on the calculated intercept value of the ΔFR or the cumulative average value of the ΔFR, the calculated intercept value of the ΔLR, and the calculated intercept value of the ΔDiag.

20 Claims, 5 Drawing Sheets

| CLASSIFICATION | WHEEL AT WHICH LOW PRESSURE OCCURS | | | | DIFFERENCE BETWEEN CALCULATED INTERCEPT VALUE AND REFERENCE INTERCEPT VALUE | | | |
|---|---|---|---|---|---|---|---|---|
| | FL | FR | RL | RR | ΔFR | | ΔLR | ΔDiag |
| | | | | | ΔTq≠0 | ΔTq=0 | | |
| NORMAL | | | | | 0 | 0 | 0 | 0 |
| ONE LOW PRESSURE | ● | | | | + | + | + | + |
| | | ● | | | + | + | − | − |
| | | | ● | | − | − | + | − |
| | | | | ● | − | − | − | + |
| TWO LOW PRESSURE | ● | ● | | | + | + | 0 | 0 |
| | | | ● | ● | − | − | 0 | 0 |
| | ● | | | ● | 0 | 0 | 0 | + |
| | | ● | ● | | 0 | 0 | 0 | − |
| | ● | | ● | | − | − | + | − |
| | | ● | | ● | 0 | 0 | − | 0 |
| THREE LOW PRESSURE | ● | ● | ● | | + | + | + | − |
| | ● | ● | | ● | + | + | − | + |
| | ● | | ● | ● | − | − | + | + |
| | | ● | ● | ● | − | − | − | − |

Fig.3

DEVICE AND METHOD FOR MONITORING TIRE PRESSURE OF ELECTRIC VEHICLE

CROSS-REFERENCE TO RELATED APPLICATION

This application claims under 35 U.S.C. § 119(a) the benefit of Korean Patent Application No. 10-2020-0160396, filed in the Korean Intellectual Property Office on Nov. 25, 2020, the entire contents of which are incorporated herein by reference.

BACKGROUND

(a) Technical Field

The present disclosure relates to a device and method for monitoring tire pressure of an electric vehicle, more particularly, to the device and method for indirectly monitoring tire pressure of all wheel drive (AWD) vehicle in which a front wheel motor and a rear wheel motor are driven independently from each other.

(b) Description of the Related Art

In general, when tire pressure is low, riding comfort and braking power may be poor, and there may be an increased possibility of an accident due to vehicle slipping, a reduction in fuel economy due to increased fuel consumption, and a reduction in tire life.

Typically, a vehicle is equipped with a tire pressure monitoring system (TPMS) that detects a decrease in tire pressure and then notifies a driver of the tire pressure. The TPMS may be roughly classified into a direct method (hereinafter, referred to as a "direct TPMS") and an indirect method (hereinafter, referred to as an "indirect TPMS").

The direct TPMS refers to a method of directly measuring the air pressure of a tire by including a pressure sensor on a wheel inside the tire. This direct TPMS may detect a decrease in air pressure of a tire with high accuracy. However, it is expensive because a dedicated wheel capable of mounting a pressure sensor is required, and a pressure sensor needs to be mounted on each of four wheels.

The indirect TPMS refers to a method of estimating the air pressure of a tire from rotation information of the tire. Such the indirect method may be further classified into a dynamic loaded radius (DLR) analysis method and a resonance frequency method (RFM) analysis method.

The RFM analysis method refers to a method of detecting a difference from the normal pressure of a tire by using a principle that frequency features of a wheel's rotation speed signal are changed for a depressurized tire. Such a frequency analysis method focuses on a resonance frequency capable of being obtained by frequency analysis of the rotation speed signal of a wheel. When a current resonance frequency is detected to be relatively lower than a reference frequency estimated on initialization, it is determined that a tire is depressurized.

The DLR analysis method refers to a method that uses a principle that the depressurized tire rotates to be faster than a tire having normal pressure because DLR of the depressurized tire is reduced when a vehicle is driving; The DLR analysis method detects a pressure drop by comparing rotational speeds of tires.

When a button for setting a reference pressure is pressed by a user as an initialization process, the indirect TPMS estimates a current tire pressure and then sets the estimated tire pressure as a reference pressure. Afterward, when it is determined, based on the set reference pressure, that a degree of decrease in a tire pressure exceeds the reference value, the indirect TPMS warns a driver.

In a process of setting a reference pressure and a process of warning of a low tire pressure, a conventional indirect TPMS needs to periodically calculate various intercept values through regression analysis, and thus the conventional indirect TPMS needs to process a large volume of computations and may take a significant amount of time.

The matters described in this background are intended to enhance the understanding of the background of the present disclosure and may include matters that are not the prior art already known to those of ordinary skill in the art.

SUMMARY

An aspect of the present disclosure provides a tire pressure monitoring device and method of an electric vehicle that does not always perform regression analysis, which needs a large amount of computation and required time to warn a driver of a low tire pressure, by selectively calculating an intercept value of $\Delta FR$ and an cumulative average value of $\Delta FR$ based on a difference $\Delta Tq$ between a torque of a front wheel motor and a torque of a rear wheel motor provided in an electric vehicle, in a process of setting a reference pressure and a process of warning of low tire pressure.

Objects of the present disclosure are not limited to the above-mentioned object, and other objects and advantages of the present disclosure that is not mentioned will be understood from the following description, and it will be apparently understood from an embodiment of the present disclosure. In addition, it will be easily understood that the objects and advantages of the disclosure are realized by means and combinations described in the appended claims.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a tire pressure monitoring device of an electric vehicle may include a first torque sensor sensing a torque of a front wheel motor provided in the electric vehicle, a second torque sensor sensing a torque of a rear wheel motor provided in the electric vehicle, a wheel speed sensor sensing a speed of each wheel of the electric vehicle, and a controller selectively calculating an intercept value of $\Delta FR$ and a cumulative average value of the $\Delta FR$ based on a difference between the torque of the front wheel motor and the torque of the rear wheel motor, calculating an intercept value of $\Delta LR$ and an intercept value of $\Delta Diag$ based on the speed of each wheel, and monitoring a tire pressure of each wheel based on the calculated intercept value of the $\Delta FR$ or the cumulative average value of the $\Delta FR$, the calculated intercept value of the $\Delta LR$, and the calculated intercept value of the $\Delta Diag$.

In an embodiment of the present disclosure, the tire pressure monitoring device may further include a warning device warning a driver of a low pressure state of a tire.

In an embodiment of the present disclosure, the controller may detect the tire, which is in the low pressure state, from among tires of the electric vehicle and may control the warning device to provide a notification of the low pressure state of the detected tire.

In an embodiment of the present disclosure, the controller may calculate the cumulative average value of the ΔFR when the difference between the torque of the front wheel motor and the torque of the rear wheel motor is within a reference range, and may calculate the intercept value of the ΔFR when the difference between the torque of the front wheel motor and the torque of the rear wheel motor is out of the reference range.

In an embodiment of the present disclosure, the controller may determine that pressures of all tires of the electric vehicle are normal, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and a difference between the intercept value of the ΔDiag and a reference intercept value of the ΔDiag is within the critical range.

In an embodiment of the present disclosure, the controller may determine that a pressure of a front left (FL) tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is greater than a reference intercept value of the ΔLR, and the intercept value of the ΔDiag is greater than a reference intercept value of the ΔDiag.

In an embodiment of the present disclosure, the controller may determine that a pressure of a front right (FR) tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is less than a reference intercept value of the ΔLR, and the intercept value of the ΔDiag is less than a reference intercept value of the ΔDiag.

In an embodiment of the present disclosure, the controller may determine that pressures of FL and rear right (RR) tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is greater than a reference intercept value of the ΔDiag.

In an embodiment of the present disclosure, the controller may determine that pressures of FR and rear left (RL) tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is less than a reference intercept value of the ΔDiag.

In an embodiment of the present disclosure, the controller may determine that pressures of FR, RL, and RR tires of the electric vehicle are low, when the intercept value of the ΔFR is less than an reference intercept value of the ΔFR, or the cumulative average value of the ΔFR is less than a reference cumulative average value of the ΔFR, and when the intercept value of the ΔLR is less than a reference intercept value of the ΔLR, and the intercept value of the ΔDiag is less than a reference intercept value of the ΔDiag.

According to an aspect of the present disclosure, a tire pressure monitoring method of an electric vehicle may include sensing, by a first torque sensor, a torque of a front wheel motor provided in an electric vehicle, sensing, by a second torque sensor, a torque of a rear wheel motor provided in the electric vehicle, sensing, by a wheel speed sensor, a speed of each wheel of the electric vehicle, and selectively calculating, by a controller, an intercept value of ΔFR and a cumulative average value of the ΔFR based on a difference between the torque of the front wheel motor and the torque of the rear wheel motor, calculating, by a controller, an intercept value of ΔLR and an intercept value of ΔDiag based on the speed of each wheel, and monitoring, by a controller, a tire pressure of each wheel based on the calculated intercept value of the ΔFR or the cumulative average value of the ΔFR, the calculated intercept value of the ΔLR, and the calculated intercept value of the ΔDiag.

In an embodiment of the present disclosure, the method may further include warning, by a warning device, a driver of a low pressure state of a tire.

In an embodiment of the present disclosure, the monitoring of the tire pressure of each wheel may include detecting the tire, which is in the low pressure state, from among tires of the electric vehicle and controlling the warning device to provide a notification of the low pressure state of the detected tire.

In an embodiment of the present disclosure, the monitoring of the tire pressure of each wheel may include calculating the cumulative average value of the ΔFR when the difference between the torque of the front wheel motor and the torque of the rear wheel motor is within a reference range and calculating the intercept value of the ΔFR when the difference between the torque of the front wheel motor and the torque of the rear wheel motor is out of the reference range.

In an embodiment of the present disclosure, the monitoring of the tire pressure of each wheel may include determining that pressures of all tires of the electric vehicle are normal, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and a difference between the intercept value of the ΔDiag and a reference intercept value of the ΔDiag is within the critical range.

In an embodiment of the present disclosure, the monitoring of the tire pressure of each wheel may include determining that a pressure of a FL tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is greater than a reference intercept value of the ΔLR, and the intercept value of the ΔDiag is greater than a reference intercept value of the ΔDiag.

In an embodiment of the present disclosure, the monitoring of the tire pressure of each wheel may include determining that a pressure of a FR tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is less than a reference intercept value of the ΔLR, and the intercept value of the ΔDiag is less than a reference intercept value of the ΔDiag.

In an embodiment of the present disclosure, the monitoring of the tire pressure of each wheel may include determining that pressures of FL and RR tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is greater than a reference intercept value of the ΔDiag.

In an embodiment of the present disclosure, the monitoring of the tire pressure of each wheel may include determining that pressures of FR and RL tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is less than a reference intercept value of the ΔDiag.

In an embodiment of the present disclosure, the monitoring of the tire pressure of each wheel may include determining that pressures of FR, RL, and RR tires of the electric vehicle are low, when an intercept value of the ΔFR is less than an reference intercept value of the ΔFR, or a cumulative average value of the ΔFR is less than a reference cumulative average value of the ΔFR, and when the intercept value of the ΔLR is less than a reference intercept value of the ΔLR, and the intercept value of the ΔDiag is less than a reference intercept value of the ΔDiag.

BRIEF DESCRIPTION OF THE DRAWINGS

The above and other objects, features and advantages of the present disclosure will be more apparent from the following detailed description taken in conjunction with the accompanying drawings:

FIG. 3 is a table illustrating a process of determining a low pressure state of a tire by a controller provided in a tire pressure monitoring device of an electric vehicle according to an exemplary embodiment of the present disclosure;

DETAILED DESCRIPTION

Figure 1:
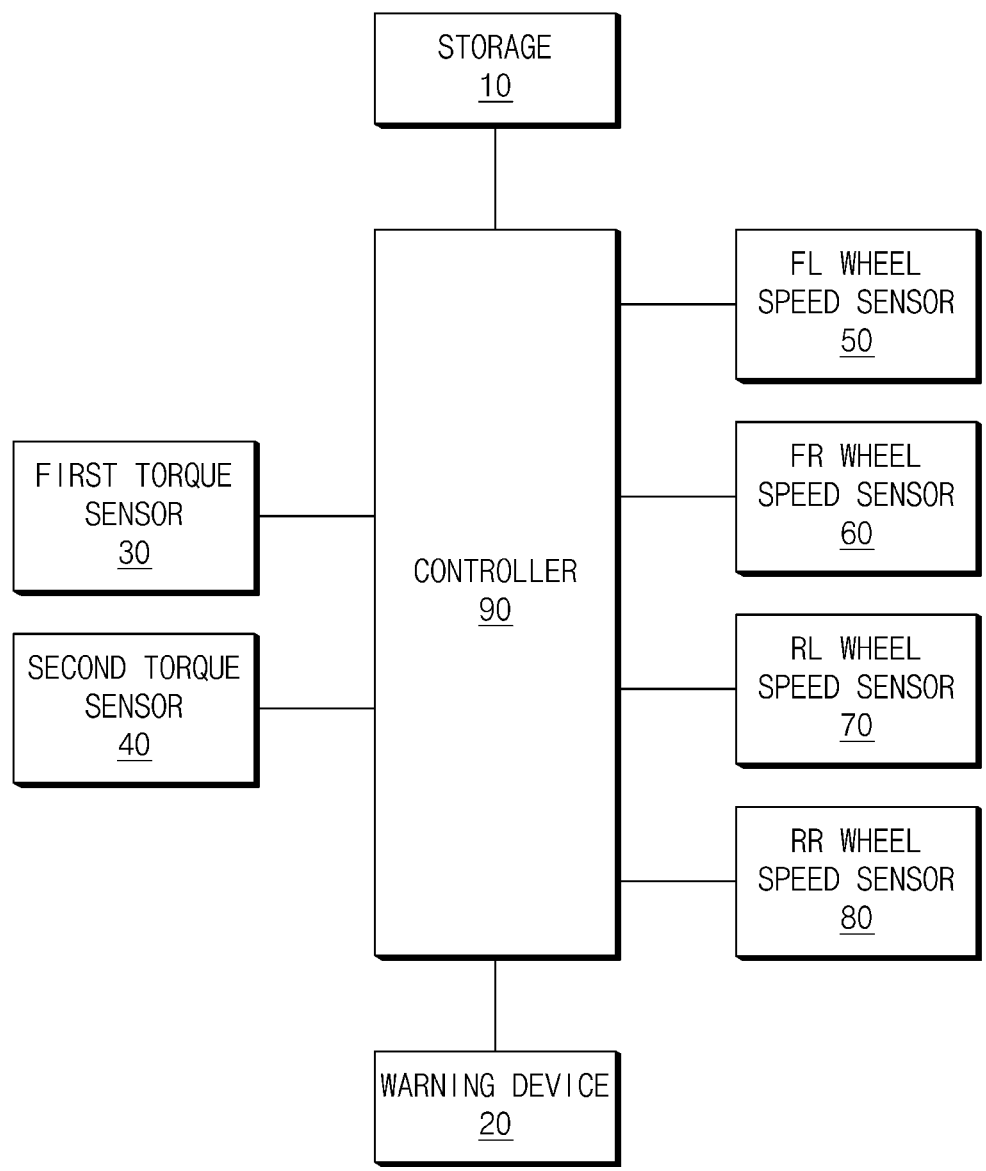
FIG. 1 is a block diagram of a tire pressure monitoring device of an electric vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of a tire pressure monitoring device of an electric vehicle according to an embodiment of the present disclosure.

As illustrated in FIG. 1, a tire pressure monitoring device of an electric vehicle according to an embodiment of the present disclosure may include storage 10, a warning device 20, a first torque sensor 30, a second torque sensor 40, a front left (FL) wheel speed sensor 50, a front right (FR) wheel speed sensor 60, an rear left (RL) wheel speed sensor 70, an rear right (RR) wheel speed sensor 80, and a controller 90. In accordance with a method of operating a tire pressure monitoring device of an electric vehicle according to an embodiment of the present disclosure, each of the components may be implemented as one device after being coupled with one another or a part of the components may be omitted.

In a process of setting a reference pressure and a process of alerting a driver of a low tire pressure, the storage 10 may store various logics, algorithms, and programs, which are required in a process of selectively calculating the intercept value of $\Delta FR$ (a difference in relative speed between front and rear wheels) and the cumulative average value of $\Delta FR$, based on a difference $\Delta Tq$ between a torque of a front wheel motor and a torque of a rear wheel motor equipped in the electric vehicle. Herein, $\Delta FR$ may be expressed as the following Equation 1.

$$\Delta FR = \frac{AV_{FW} - AV_{RW}}{AV_{4W}} \quad \text{[Equation 1]}$$

Herein, $AV_{FW}$ denotes an average of an FL wheel speed and an FR wheel speed, as front wheels (FWs); $AV_{RW}$ denotes an average of an RL wheel speed and an RR wheel speed, as rear wheels (RWs); and, $AV_{4W}$ denotes an average of the FL wheel speed, the FR wheel speed, the RL wheel speed, and the RR wheel speed.

The storage 10 may store a reference range (e.g., $-M<\Delta Tq<M$, $M\approx 0$) of $\Delta Tq$ used in a process of selectively calculating the intercept value of $\Delta FR$ and the cumulative average value of $\Delta FR$. At this time, the reference range of $\Delta Tq$ may be arbitrarily changed depending on the intent of a designer.

The storage 10 may store a reference intercept value and a reference cumulative average value of $\Delta FR$ (a speed difference between front and rear wheels), a reference intercept value of $\Delta LR$ (a speed difference between left and right wheels), and a reference intercept value of $\Delta Diag$ (a speed difference between wheels located diagonally) that are determined through learning.

The storage 10 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

The warning device 20 may warn a driver of a low tire pressure. The warning device 20 may warn the driver in a manner of at least one of a visual warning, an audible warning, or a tactile warning. For example, the warning device 20 may include a visual warning device, an audible warning device, and a tactile warning device.

The first torque sensor 30 may detect a torque of a front wheel motor equipped in an electric vehicle. At this time, the front wheel motor may apply torques to the FL wheel and the FR wheel, and may be driven independently of the rear wheel motor under the control of the controller 90.

The second torque sensor 40 may detect a torque of the rear wheel motor provided in the electric vehicle. At this time, the rear wheel motor may apply torques to the RL wheel and the RR wheel, and may be driven independently of the front wheel motor under the control of the controller 90.

The FL wheel speed sensor 50 may detect a speed of the FL wheel provided in the electric vehicle.

The FR wheel speed sensor 60 may detect a speed of the FR wheel provided in the electric vehicle.

The RL wheel speed sensor 70 may detect a speed of the RL wheel provided in the electric vehicle.

The RR wheel speed sensor 80 may detect a speed of the RR wheel provided in the electric vehicle.

The controller 90 may perform overall control such that each of the components is capable of normally performing functions of the components. The controller 90 may be implemented in the form of hardware, may be implemented in the form of software, or may be implemented in the form of the combination of hardware and software. Favorably, the controller 90 may be implemented as a microprocessor, but is not limited thereto.

In particular, in a process of setting a reference pressure and a process of warning a driver of a low tire pressure, the controller 90 may variously control a process of selectively calculating an intercept value of $\Delta FR$ and an cumulative average value of $\Delta FR$, based on a difference $\Delta Tq$ between a torque of a front wheel motor and a torque of a rear wheel motor equipped in the electric vehicle.

Hereinafter, an operation of the controller 90 will be described in detail with reference to FIGS. 2 to 3.

Figure 2:
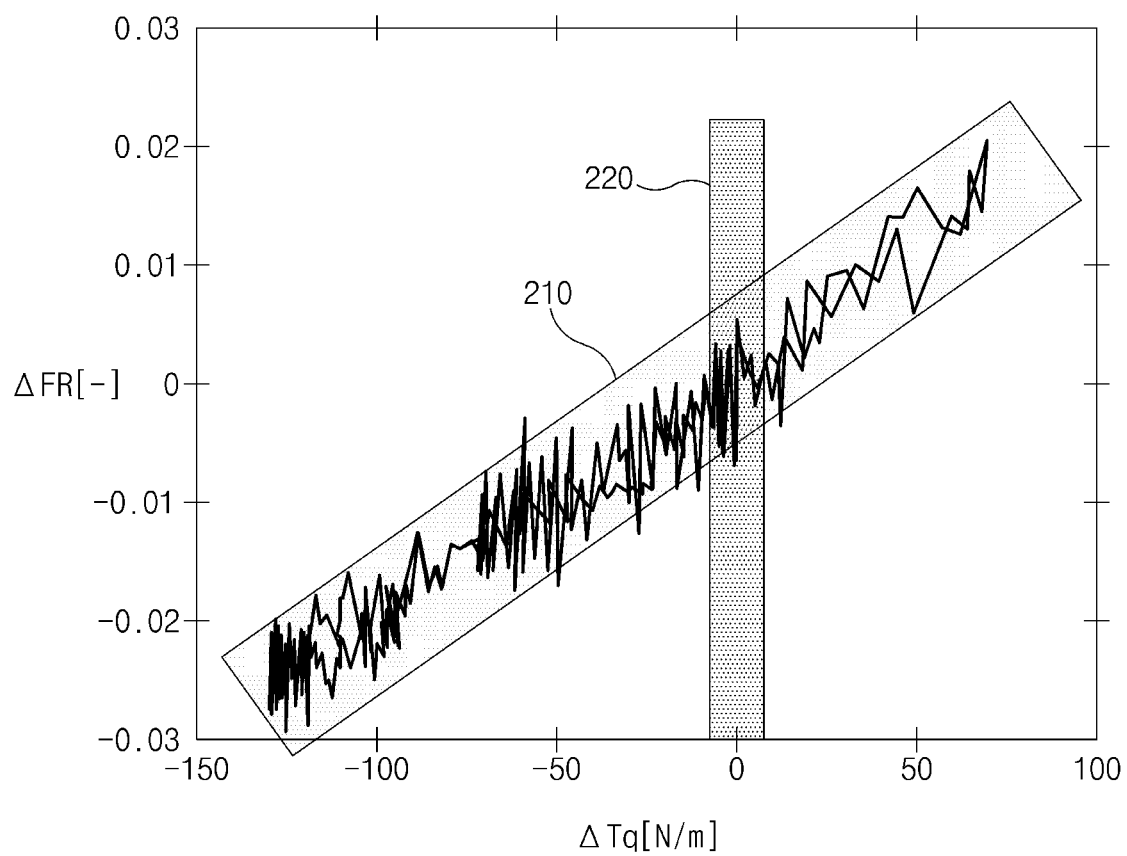
FIG. 2 is a diagram illustrating a relationship between ΔFR and ΔTq that are calculated by a controller provided in a tire pressure monitoring device of an electric vehicle according to an embodiment of the present disclosure.

FIG. 2 is a graph illustrating a relationship between $\Delta FR$ and $\Delta Tq$ that are calculated by a controller provided in a tire pressure monitoring device of an electric vehicle according to an embodiment of the present disclosure.

In FIG. 2, a vertical axis denotes $\Delta FR$; a horizontal axis denotes $\Delta Tq$; '210' denotes an area in which an intercept value of $\Delta FR$ is calculated through regression analysis; and, '220' is an area, in which a cumulative average value of $\Delta FR$ is calculated, and denotes a reference range of $\Delta Tq$.

The controller 90 may calculate $\Delta LR$ (a relative speed difference between left and right wheels) through the following Equation 2; and the controller 90 may calculate $\Delta Diag$ (a relative speed difference between one diagonal wheel and the other diagonal wheel that is located diagonally from the one diagonal wheel) through the following Equation 3.

$$\Delta LR = \frac{AV_{LW} - AV_{RW}}{AV_{4W}} \quad \text{[Equation 2]}$$

Herein, $AV_{LW}$ denotes an average of a speed of an FL wheel and a speed of an RL wheel as left wheels (LWs); $AV_{RW}$ denotes an average of a speed of an FR wheel and a speed of an RR wheel as right wheels (RW); and, $AV_{4W}$ denotes an average of the FL wheel speed, the FR wheel speed, the RL wheel speed, and the RR wheel speed.

$$\Delta \text{Diag} = \frac{AV_{Diag1} - AV_{Diag2}}{AV_{4W}} \quad \text{[Equation 3]}$$

Herein, $AV_{Diag1}$ denotes an average of a speed of the FL wheel and a speed of the RR wheel; $AV_{Diag2}$ denotes an average of a speed of an FR wheel and a speed of an RL wheel; and $AV_{4W}$ denotes an average of the FL wheel speed, the FR wheel speed, the RL wheel speed, and the RR wheel speed.

A method, in which the controller 90 calculates the intercept value of $\Delta$FR, the intercept value of $\Delta$LR, and the intercept value of $\Delta$Diag based on regression analysis, is not the gist of the present disclosure, and thus any of the generally well-known various methods may be used. In an embodiment, the controller 90 may perform regression analysis on a graph indicating a relationship between $\Delta$Tq and $\Delta$FR as illustrated in FIG. 2, may generate a linear equation as shown in Equation 4 below, and may detect value 'y' at a point in time when "x=0" as an intercept value. At this time, a regression analysis technology itself is a well-known technology, and thus the detailed description thereof will be omitted.

$$y = ax + b \quad \text{[Equation 4]}$$

Here, 'a' denotes a slope; and, 'b' denotes an intercept value.

In particular, when $\Delta$Tq satisfies a reference range, the controller 90 calculates a cumulative average value of $\Delta$FR; when $\Delta$Tq is out of the reference range, the controller 90 calculates an intercept value of $\Delta$FR. At this time, there is no need to calculate the intercept value of $\Delta$FR through regression analysis when $\Delta$Tq satisfies the reference range. Accordingly, an amount of computation may be reduced, and a required time may be shortened.

In another embodiment, the controller 90 may also calculate $\Delta$FR, using a first RPM sensor (not shown) that measures the revolutions per minute (RPM) of a front wheel motor and a second RPM sensor (not shown) that measures the RPM of a rear wheel motor without using the FL wheel speed sensor 50, the FR wheel speed sensor 60, the RL wheel speed sensor 70, and the RR wheel speed sensor. At this time, the controller 90 may use the following Equation 5.

$$\Delta FR = \frac{FM_{RPM} - RM_{RPM}}{AM_{RPM}} \quad \text{[Equation 5]}$$

Herein, $FM_{RPM}$ denotes the RPM of the front wheel motor; $RM_{RPM}$ denotes the RPM of the rear wheel motor; and, $AM_{RPM}$ denotes an average value of the RPM of the front wheel motor and the RPM of the rear wheel motor.

FIG. 3 is a table illustrating a process of determining a low pressure state of a tire by a controller provided in a tire pressure monitoring device of an electric vehicle according to an exemplary embodiment of the present disclosure.

As illustrated in FIG. 3, the controller 90 may identify a tire with low pressure based on an intercept value of $\Delta$FR or a cumulative average value of $\Delta$FR, an intercept value of $\Delta$LR, and an intercept value of $\Delta$Diag. At this time, the controller 90 may calculate the intercept value of $\Delta$FR or the cumulative average value of $\Delta$FR, the intercept value of $\Delta$LR, and the intercept value of $\Delta$Diag, using an FL wheel speed detected by the FL wheel speed sensor 50, an FR wheel speed detected by the FR wheel speed sensor 60, an RL wheel speed detected by the RL wheel speed sensor 70, and an RR wheel speed detected by the RR wheel speed sensor 80. When $\Delta$Tq does not satisfy a reference range (e.g., $\Delta$Tq≠0), the controller 90 calculates the intercept value of $\Delta$FR; when $\Delta$Tq satisfies the reference range (e.g., $\Delta$Tq=0), the controller 90 calculates the cumulative average value of $\Delta$FR.

For example, when a difference between the intercept value of $\Delta$FR and a reference intercept value of $\Delta$FR is 0 (or within a critical range), or a difference between a cumulative average value of $\Delta$FR and a reference cumulative average value of $\Delta$FR is 0, and when a difference between an intercept value of $\Delta$LR and a reference intercept value of $\Delta$LR is 0, and a difference between an intercept value of $\Delta$Diag and a reference intercept value of $\Delta$Diag is 0, the controller 90 may determine that pressures of all tires in an electric vehicle are normal.

As another example, when the intercept value of $\Delta$FR is greater than the reference intercept values of $\Delta$FR (displayed as "+"), or the cumulative average value of $\Delta$FR is greater than the reference cumulative average value of $\Delta$FR (+), and when the intercept value of $\Delta$LR is greater than the reference intercept values of $\Delta$LR (+), and the intercept value of $\Delta$Diag is greater than the reference intercept value of $\Delta$Diag (+), the controller 90 may determine that the pressure of a FL tire of the electric vehicle is in a low pressure state.

As still another example, when the intercept value of $\Delta$FR is greater than the reference intercept values of $\Delta$FR (+), or the cumulative average value of $\Delta$FR is greater than the reference cumulative average value of $\Delta$FR (+), and when the intercept value of $\Delta$LR is less than the reference intercept value of $\Delta$LR (displayed as "−"), and the intercept value of $\Delta$Diag is less than the reference intercept value of $\Delta$Diag (−), the controller 90 may determine that the pressure of a FR tire of the electric vehicle is in a low pressure state.

As yet another example, when the difference between the intercept value of $\Delta$FR and the reference intercept value of $\Delta$FR is 0 (or within a critical range), or the difference between the cumulative average value of $\Delta$FR and the reference cumulative average value of $\Delta$FR is 0, and when the difference between the intercept value of $\Delta$LR and the reference intercept value of $\Delta$LR is 0, and the intercept value of $\Delta$Diag is greater than the reference intercept value of $\Delta$Diag (+), the controller 90 may determine that pressures of FL and RR tires in the electric vehicle to be in a low pressure state.

As yet another example, when the difference between the intercept value of $\Delta$FR and the reference intercept value of $\Delta$FR is 0 (or within a critical range), or the difference between the cumulative average value of $\Delta$FR and the reference cumulative average value of $\Delta$FR is 0, and when the difference between the intercept value of $\Delta$LR and the reference intercept value of $\Delta$LR is 0, and the intercept value of $\Delta$Diag is less than the reference intercept value of $\Delta$Diag (−), the controller 90 may determine that pressures of FR and RL tires in the electric vehicle to be in a low pressure state.

As yet another example, when the intercept value of $\Delta$FR is less than the reference intercept values of $\Delta$FR (−), or the cumulative average value of $\Delta$FR is less than the reference cumulative average value of $\Delta$FR (−), and when the intercept value of $\Delta$LR is less than the reference intercept value of $\Delta$LR (−), and the intercept value of $\Delta$Diag is less than the reference intercept value of $\Delta$Diag (−), the controller 90 may determine that the pressures of FR, RL, and RR tires in the electric vehicle are in a low pressure state.

Figure 4:
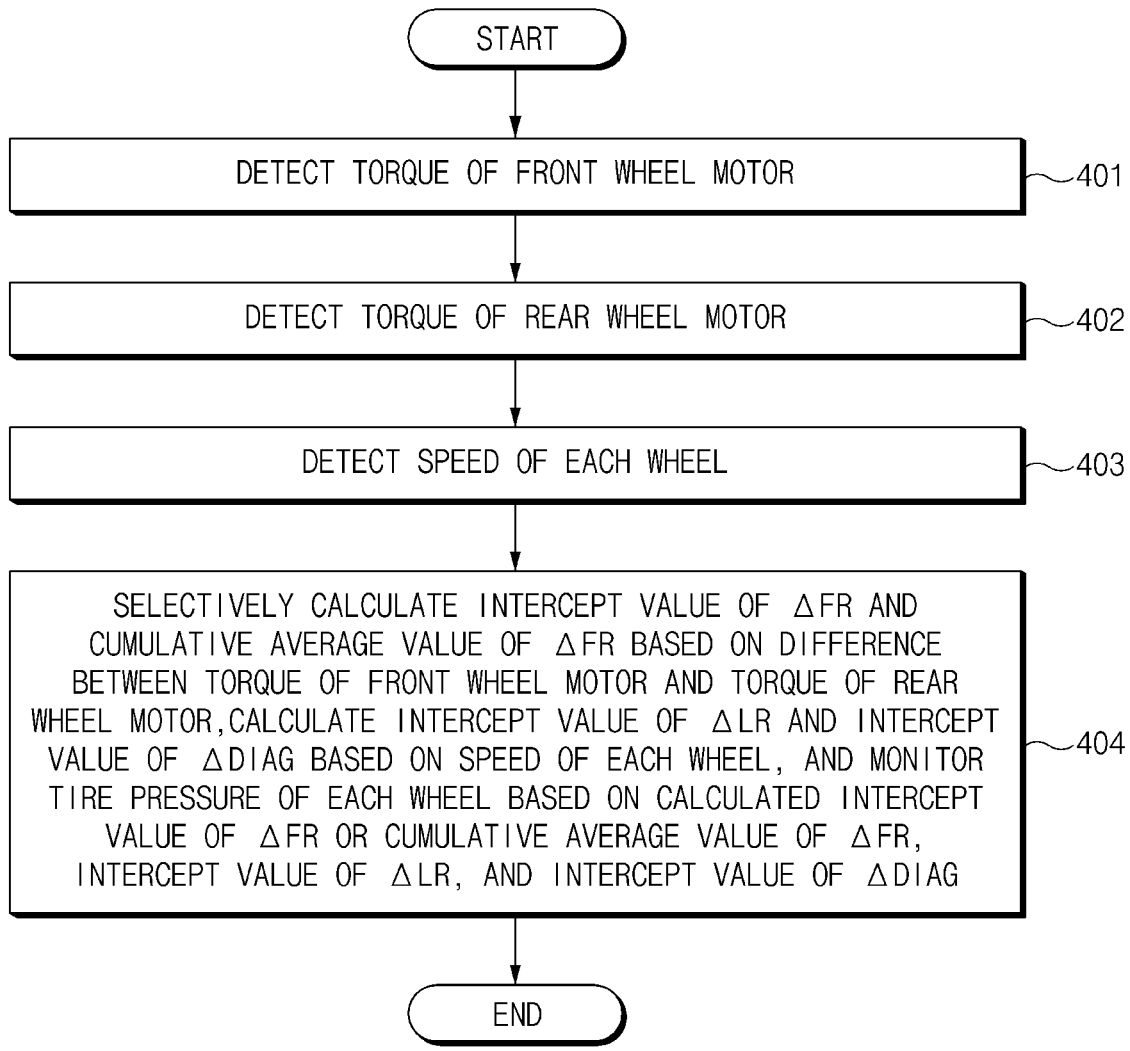
FIG. 4 is a flowchart of a tire pressure monitoring method of an electric vehicle according to an embodiment of the present disclosure.

FIG. 4 is a flowchart of a tire pressure monitoring method of an electric vehicle according to an embodiment of the present disclosure.

The first torque sensor 30 detects a torque of a front wheel motor provided in an electric vehicle (401).

The second torque sensor 40 detects a torque of a rear wheel motor provided in the electric vehicle (402).

The wheel speed sensors 50 to 80 detect speeds of wheels of the electric vehicle, respectively (403).

The controller 90 selectively calculates an intercept value of ΔFR and a cumulative average value of ΔFR based on a difference between a torque of the front wheel motor and a torque of the rear wheel motor, calculates an intercept value of ΔLR and an intercept value of ΔDiag based on the speed of each wheel, and monitors a tire pressure of each wheel based on the calculated intercept value of the ΔFR or the cumulative average value of the ΔFR, the intercept value of the ΔLR, and the intercept value of the ΔDiag.

Figure 5:
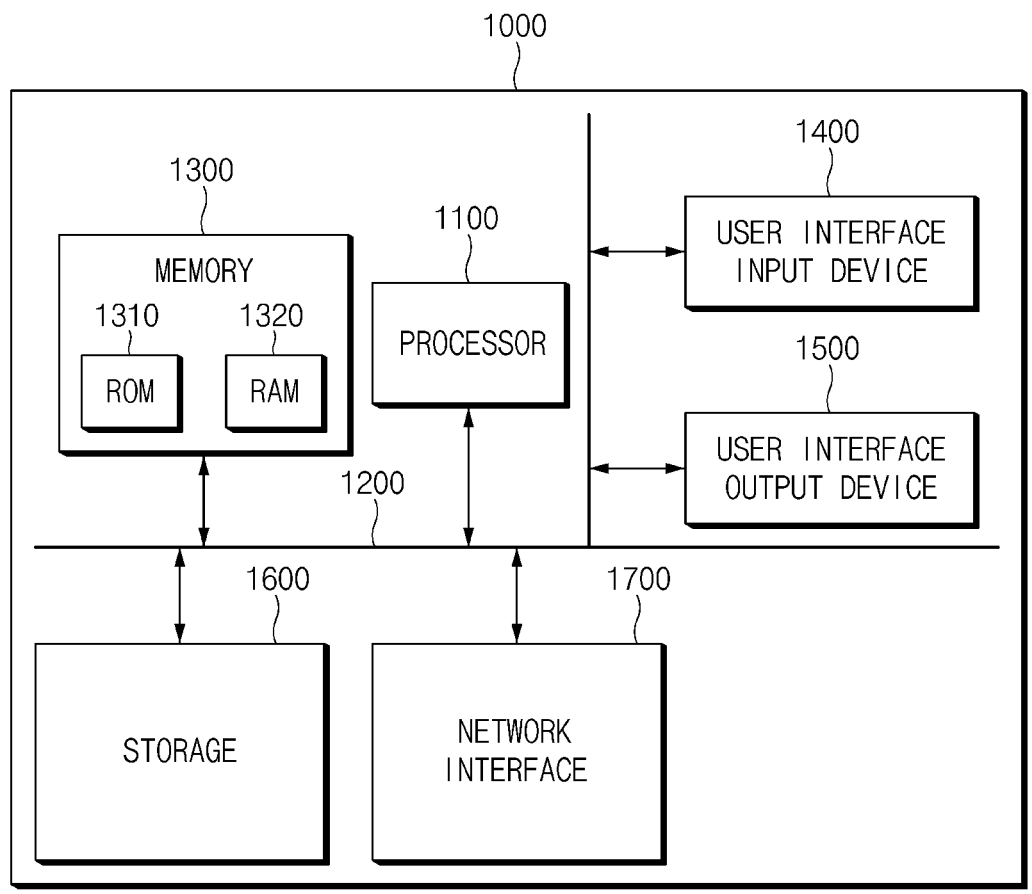
FIG. 5 is a block diagram illustrating a computing system for performing a tire pressure monitoring method of an electric vehicle according to an embodiment of the present disclosure.

FIG. 5 is a block diagram illustrating a computing system for performing a tire pressure monitoring method of an electric vehicle according to an embodiment of the present disclosure.

Referring to FIG. 5, the tire pressure monitoring method of an electric vehicle according to an embodiment of the present disclosure may be implemented through the computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, solid state drive (SSD), a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to an embodiment of the present disclosure, a tire pressure monitoring device and method of an electric vehicle may not always perform regression analysis, which needs a large amount of computation and required time to warn a driver of a low tire pressure, by selectively calculating an intercept value of ΔFR and an cumulative average value of ΔFR based on a difference ΔTq between a torque of a front wheel motor and a torque of a rear wheel motor provided in an electric vehicle, in a process of setting a reference pressure and a process of warning of low tire pressure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A tire pressure monitoring device of an electric vehicle, the tire pressure monitoring device comprising:
   a first torque sensor configured to sense a torque of a front wheel motor provided in the electric vehicle;
   a second torque sensor configured to sense a torque of a rear wheel motor provided in the electric vehicle;
   a wheel speed sensor configured to sense a speed of each wheel of the electric vehicle; and
   a controller configured to:
   selectively calculate an intercept value of ΔFR and a cumulative average value of the ΔFR based on a difference between the torque of the front wheel motor and the torque of the rear wheel motor;
   calculate an intercept value of ΔLR and an intercept value of ΔDiag based on the speed of each wheel; and
   monitor a tire pressure of each wheel based on the calculated intercept value of the ΔFR, the calculated intercept value of the ΔLR, and the calculated intercept value of the ΔDiag,
   wherein the ΔFR is obtained by dividing a difference between an average speed of front wheels and an average speed of rear wheels by an average speed of four wheels,
   wherein the ΔLR is obtained by dividing a difference between an average speed of left wheels and an average speed of right wheels by the average speed of the four wheels, and
   wherein the ΔDiag is obtained by dividing a difference between an average speed of one diagonal wheel and an average speed of the other diagonal wheel by the average speed of the four wheels.

2. The tire pressure monitoring device of claim 1, further comprising:
   a warning device configured to warn a driver of a low pressure state of a tire.

3. The tire pressure monitoring device of claim 2, wherein the controller detects the tire, which is in the low pressure state, from among tires of the electric vehicle and controls the warning device to provide a notification of the low pressure state of the detected tire.

4. The tire pressure monitoring device of claim 1, wherein the controller calculates the cumulative average value of the ΔFR when the difference between the torque of the front wheel motor and the torque of the rear wheel motor is within a reference range, and calculates the intercept value of the ΔFR when the difference between the torque of the front wheel motor and the torque of the rear wheel motor is out of the reference range.

5. The tire pressure monitoring device of claim 1, wherein the controller determines that pressures of all tires of the electric vehicle are normal, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and a difference between the intercept value of the ΔDiag and a reference intercept value of the ΔDiag is within the critical range.

6. The tire pressure monitoring device of claim 1, wherein the controller determines that a pressure of a front left tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is greater than a reference intercept value of the ΔLR, and the intercept value of the ΔDiag is greater than a reference intercept value of the ΔDiag.

7. The tire pressure monitoring device of claim 1, wherein the controller determines that a pressure of a front right (FR) tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is less than a reference intercept value of the ΔLR, and the intercept value of the ΔDiag is less than a reference intercept value of the ΔDiag.

8. The tire pressure monitoring device of claim 1, wherein the controller determines that pressures of front left and rear right tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is greater than a reference intercept value of the ΔDiag.

9. The tire pressure monitoring device of claim 1, wherein the controller determines that pressures of front right and rear left tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is less than a reference intercept value of the ΔDiag.

10. The tire pressure monitoring device of claim 1, wherein the controller determines that pressures of front right, rear left, and rear right tires of the electric vehicle are low, when the intercept value of the ΔFR is less than an reference intercept value of the ΔFR, or the cumulative average value of the ΔFR is less than a reference cumulative average value of the ΔFR, and when the intercept value of the ΔLR is less than a reference intercept value of the ΔLR, and the intercept value of the ΔDiag is less than a reference intercept value of the ΔDiag.

11. A tire pressure monitoring method of an electric vehicle, the method comprising:
sensing, by a first torque sensor, a torque of a front wheel motor provided in the electric vehicle;
sensing, by a second torque sensor, a torque of a rear wheel motor provided in the electric vehicle;
sensing, by a wheel speed sensor, a speed of each wheel of the electric vehicle; and
selectively calculating, by a controller, an intercept value of ΔFR and a cumulative average value of the ΔFR based on a difference between the torque of the front wheel motor and the torque of the rear wheel motor, calculating, by a controller, an intercept value of ΔLR and an intercept value of ΔDiag based on the speed of each wheel, and monitoring, by a controller, a tire pressure of each wheel based on the calculated intercept value of the ΔFR, the calculated intercept value of the ΔLR, and the calculated intercept value of the ΔDiag,
wherein the ΔFR is obtained by dividing a difference between an average speed of front wheels and an average speed of rear wheels by an average speed of four wheels,
wherein the ΔLR is obtained by dividing a difference between an average speed of left wheels and an average speed of right wheels by the average speed of the four wheels, and
wherein the ΔDiag is obtained by dividing a difference between an average speed of one diagonal wheel and an average speed of the other diagonal wheel by the average speed of the four wheels.

12. The method of claim 11, further comprising:
warning, by a warning device, a driver of a low pressure state of a tire.

13. The method of claim 12, wherein monitoring the tire pressure of each wheel includes:
detecting the tire, which is in the low pressure state, from among tires of the electric vehicle; and
controlling the warning device to provide a notification of the low pressure state of the detected tire.

14. The method of claim 11, wherein monitoring the tire pressure of each wheel includes:
calculating the cumulative average value of the ΔFR when the difference between the torque of the front wheel motor and the torque of the rear wheel motor is within a reference range; and
calculating the intercept value of the ΔFR when the difference between the torque of the front wheel motor and the torque of the rear wheel motor is out of the reference range.

15. The method of claim 11, wherein monitoring the tire pressure of each wheel includes:
determining that pressures of all tires of the electric vehicle are normal, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and a difference between the intercept value of the ΔDiag and a reference intercept value of the ΔDiag is within the critical range.

16. The method of claim 11, wherein monitoring the tire pressure of each wheel includes:
  determining that a pressure of a FL tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is greater than a reference intercept value of the ΔLR, and the intercept value of the ΔDiag is greater than a reference intercept value of the ΔDiag.

17. The method of claim 11, wherein monitoring the tire pressure of each wheel includes:
  determining that a pressure of a FR tire of the electric vehicle is low, when the intercept value of the ΔFR is greater than an reference intercept value of the ΔFR, or the cumulative average value of the ΔFR is greater than a reference cumulative average value of the ΔFR, and when the intercept value of the ΔLR is less than a reference intercept value of the ΔLR, and the intercept value of the ΔDiag is less than a reference intercept value of the ΔDiag.

18. The method of claim 11, wherein monitoring the tire pressure of each wheel includes:
  determining that pressures of FL and RR tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is greater than a reference intercept value of the ΔDiag.

19. The method of claim 11, wherein monitoring the tire pressure of each wheel includes:
  determining that pressures of FR and RL tires of the electric vehicle are low, when a difference between the intercept value of the ΔFR and a reference intercept value of the ΔFR is within a critical range, or a difference between the cumulative average value of the ΔFR and a reference cumulative average value of the ΔFR is within the critical range, and when a difference between the intercept value of the ΔLR and a reference intercept value of the ΔLR is within the critical range, and the intercept value of the ΔDiag is less than a reference intercept value of the ΔDiag.

20. The method of claim 11, wherein monitoring the tire pressure of each wheel includes:
  determining that pressures of FR, RL, and RR tires of the electric vehicle are low, when an intercept value of the ΔFR is less than an reference intercept value of the ΔFR, or a cumulative average value of the ΔFR is less than a reference cumulative average value of the ΔFR, and when the intercept value of the ΔLR is less than a reference intercept value of the ΔLR, and the intercept value of the ΔDiag is less than a reference intercept value of the ΔDiag.

* * * * *